US011928016B2

(12) United States Patent
Xu

(10) Patent No.: US 11,928,016 B2
(45) Date of Patent: Mar. 12, 2024

(54) FAILURE PREDICTION IN DISTRIBUTED ENVIRONMENTS

(71) Applicant: Visa International Service Association, San Francisco, CA (US)

(72) Inventor: Minghua Xu, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 56 days.

(21) Appl. No.: 17/783,999

(22) PCT Filed: Dec. 9, 2019

(86) PCT No.: PCT/US2019/065283
§ 371 (c)(1),
(2) Date: Jun. 9, 2022

(87) PCT Pub. No.: WO2021/118526
PCT Pub. Date: Jun. 17, 2021

(65) Prior Publication Data
US 2023/0023646 A1 Jan. 26, 2023

(51) Int. Cl.
*G06F 11/07* (2006.01)
*G06N 20/00* (2019.01)

(52) U.S. Cl.
CPC ........ *G06F 11/079* (2013.01); *G06F 11/0709* (2013.01); *G06N 20/00* (2019.01)

(58) Field of Classification Search
CPC .... G06F 11/079; G06F 11/0709; G06N 20/00
See application file for complete search history.

(56) References Cited

U.S. PATENT DOCUMENTS

2015/0254555 A1 9/2015 Williams, Jr. et al.
2016/0048766 A1 2/2016 McMahon et al.
2016/0088006 A1 3/2016 Gupta et al.
2017/0300824 A1 10/2017 Peng et al.
2018/0174067 A1* 6/2018 Spiro ..................... G06N 20/00
2018/0248905 A1 8/2018 Cote et al.
2022/0039673 A1* 2/2022 Sobol ..................... G06N 20/00

FOREIGN PATENT DOCUMENTS

WO 2019125445 6/2019

OTHER PUBLICATIONS

Application No. EP19956098.8 , Extended European Search Report, dated Nov. 11, 2022, 8 pages.
Application No. PCT/US2019/065283 , International Search Report and Written Opinion, dated Sep. 7, 2020, 12 pages.

* cited by examiner

*Primary Examiner* — Jigar P Patel
(74) *Attorney, Agent, or Firm* — Kilpatrick Townsend & Stockton LLP

(57) ABSTRACT

Embodiments of the invention are directed to systems, method, and devices for detecting failures in distributed systems. A failure detection platform may identify anomalies in time series data, the time series data corresponding to historical network messages. The anomalies can be labeled and used to train a first predictive model. At least one other model may be trained using the time series data, the anomaly labels and a supervised machine-learning algorithm. A third model can be trained to identify a system failure based at least in part on the outputs provided by the first and the second model. The third model, once trained, can be utilized to predict a future system failure.

20 Claims, 3 Drawing Sheets

MONITORING COMPUTER 102
USER 104
USER DEVICE 106
ACCESS DEVICE 108
RESOURCE PROVIDER COMPUTER 110
TRANSPORT COMPUTER 112
PROCESSING NETWORK COMPUTER 114
AUTHORIZING ENTITY COMPUTER 116
100

FAILURE PREDICTION IN DISTRIBUTED ENVIRONMENTS

CROSS-REFERENCE TO RELATED APPLICATIONS

This application is a 371 National Stage of International application No. PCT/US2019/065283, filed on Dec. 9, 2019, the disclosure of which is herein incorporated by reference in its entirety for all purposes.

BACKGROUND

Most modern distributed systems include many internal components interconnected with multiple external services and/or systems. Failure detection in these systems can be equally complex. Conventionally, failure detection is typically reactive where actions are often perform after a failure has already occurred. Failure prediction systems also heavily rely on an assumption that every component of the system is accessible such as the central processing unit (CPU), memory, input/output components, and the like. In distributed systems, one entity does not typically have access to every component. Improvements can be made with respect to detecting failures in distributed systems. Embodiments of this disclosure address these and other problems, individually and collectively.

SUMMARY

One embodiment of the invention is directed to a method. The method may comprise obtaining, by a failure detection platform, time series data corresponding to historical network messages. The method may further comprise identifying, by the failure detection platform, a plurality of anomalies in the time series data. The method may further comprise associating, by the failure detection platform, one or more anomalies of the plurality of anomalies with a classification label indicative of a network failure. The method may further comprise training, by the failure detection platform, a first model of a plurality of models utilizing the time series data. The method may further comprise training, by the failure detection platform, a second model of the plurality of models utilizing the time series data, the one or more anomalies associated with the classification label, and a supervised machine-learning algorithm. The method may further comprise training, by the failure detection platform, a third model based at least in part on outputs of the plurality of models and supplemental data. The method may further comprise predicting, by the failure detection platform, a future system failure utilizing the third model. The method may further comprise performing, by the failure detection platform, one or more remedial actions in response to predicting the future system failure.

Another embodiment of the invention is directed to a computing device comprising one or more processors and a memory comprising a computer readable storage medium that stores computer-executable instructions that, when executed by the processor, cause the computing device to perform operations. The operations may comprise obtaining, by a failure detection platform, time series data corresponding to historical network messages. The operations may further comprise identifying, by the failure detection platform, a plurality of anomalies in the time series data. The operations may further comprise associating, by the failure detection platform, one or more anomalies of the plurality of anomalies with a classification label indicative of a network failure. The operations may further comprise training, by the failure detection platform, a first model of a plurality of models utilizing the time series data. The operations may further comprise training, by the failure detection platform, a second model of the plurality of models utilizing the time series data, the one or more anomalies associated with the classification label, and a supervised machine-learning algorithm. The operations may further comprise training, by the failure detection platform, a third model based at least in part on outputs of the plurality of models and supplemental data. The operations may further comprise predicting, by the failure detection platform, a future system failure utilizing the third model. The operations may further comprise performing, by the failure detection platform, one or more remedial actions in response to predicting the future system failure.

Further details regarding embodiments of the invention can be found in the Detailed Description and the Figures.

DETAILED DESCRIPTION

Figure 1:
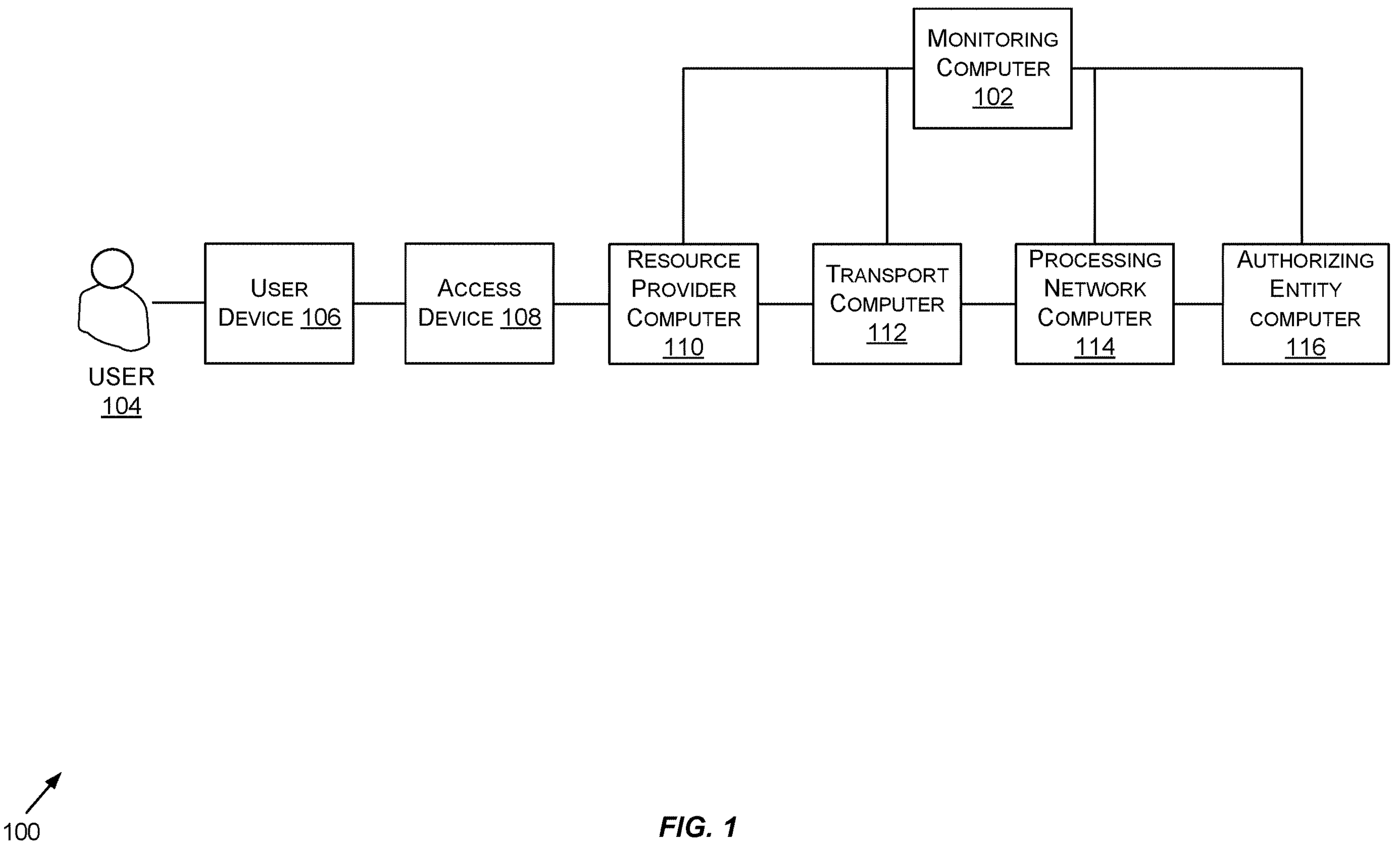
FIG. 1 shows a block diagram of an example distributed system in which a monitoring computer can be utilized to predict future system failures, according to some embodiments.

Embodiments of the present invention are directed to performing a federated task utilizing a secure platform computer. In some embodiments, the task may be related to generating and utilizing a machine-learning model. Although examples herein are directed to situations in which a machine-learning model is generated, it should be appreciated that the secure platform computer may be utilized in other contexts other than machine-learning in order to provide a secure task execution environment for two or more entities.

Two or more entities may utilize the secure platform computer disclosed herein to define a project and to provide their respective project data. Project data from each entity may be stored by the secure platform computer in a secure memory space (e.g., an enclave managed by the chipset of the secure platform computer). In some embodiments, this secure memory space may be accessible only to the chip set and/or applications and/or modules executing within the secure memory space and inaccessible to other processes and/or systems. By utilizing the secure platform computer, each entity can contribute to the project while ensuring that their data is kept private.

Prior to discussing specific embodiments of the invention, some terms may be described in detail.

The term "computing device" generally refers to a device that performs computations. A computing device may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

A "user device" may be a device owned or operated by a user. A user device may be, for example, a smart phone, smart watch, laptop, desktop, or game console. In some cases a user device may be a web browser, or a combination of hardware, such as a smart phone and a web browser. As another example, a user device can include a payment card such as a credit card, debit card, smart card, or the like. The user device may be configured with payment credentials which the user device can transmit during the course of a transaction.

"Time series data" refers to a series of data points that are indexed by time. Each data point may include any suitable number of data attributes. Each data point can be associated with a timestamp or other suitable indicator of time (or order with respect to other data points a series).

A "machine-learning algorithm" may be utilized to build a mathematical model based on sample data, known as "training data," in order to make predictions or decisions without being explicitly programmed to perform the task. Some machine-learning algorithms include supervised learning algorithms (e.g., classification algorithms, regression algorithms, decision trees, random forest algorithms, etc. which utilize labeled training data), semi-supervised learning algorithms (e.g., algorithms which utilize training data in which some training examples are labeled and some are not), unsupervised learning algorithms (e.g., cluster analysis algorithms, k-nearest neighbor, Apriori, etc.), reinforced learning algorithms (e.g., Markov decision processes, etc.).

A "machine-learning model" may be a mathematical representation of a real-world process. In some embodiments, a machine-learning model be a mathematical model that is generated (e.g., trained) utilizing training data and a machine-learning algorithm. Some example models include, artificial neural networks, recurrent neural networks, decision trees, Bayesian networks, and the like.

An "anomaly" refers a condition or event that deviates from what is standard, normal, or expected. By way of example, a response (e.g., an authorization response message) to a message (e.g., an authorization request message) may typically be received some period of time after transmission of the message. If a response is not received within some threshold of that period of time elapsing, such an event may be considered an anomaly. As another non-limiting example, some messages have expected data field values (e.g., values that have been received in historic messages and/or in conformance to a specification of the message). When a message is received with a data field value that is different from these expected data field values, the event can be considered an anomaly. A "plurality of anomalies" may refer to multiple anomalies that may be identified within a collection of time series data.

A "classification label" may refer to any suitable identifier that classifies an instance of time series data. By way of example, a classification label may be utilized to indicate an instance of time series data includes one or more anomalies (e.g., an unexpected data field value, unexpected message receipt, an unexpected delay in message reception, etc.).

An "autoregressive integrated moving average (ARIMA) model" is a generalization of an autoregressive moving average (ARMA) model. A category of models that include ARIMA and ARMA may be referred to as "autoregressive algorithms." These models are fitted to time series data either to better understand the data or to predict future points in the series (referred to as "forecasting"). The AR part of ARIMA indicates that the evolving variable of interest is regressed on its own lagged (e.g., prior) values. The MA part indicates that the regression error is actually a linear combination of error terms whose values occurred contemporaneously and at various times in the past. The I part indicates that the data values have been replaced (e.g., transformed) with the difference between their values and the previous values. The purpose of each of these features is to make the model fit the data as well as possible.

A "mixture model" refers to a statistical model that utilizes a number of mixture components. A typical finite-dimensional mixture model is a hierarchical model consisting of the following components: 1) N random variables that are observed, each distributed according to a mixture of K components, with the components belonging to the same parametric family of distributions (e.g., all normal, all Zipfian, etc.) but with different parameters, 2) N random latent variables specifying the identity of the mixture component of each observation, each distributed according to a K-dimensional categorical distribution, 3) a set of K mixture weights, which are probabilities that sum to 1, and 4) a set of K parameters, each specifying the parameter of the corresponding mixture component. In many cases, each "parameter" is actually a set of parameters. For example, if the mixture components are Gaussian distributions, there will be a mean and variance for each component. If the mixture components are categorical distributions (e.g., when each observation is a token from a finite alphabet of size V), there will be a vector of V probabilities summing to 1. In a Bayesian setting, the mixture weights and parameters will themselves be random variables, and prior distributions will be placed over the variables. In such cases, the weights may be typically viewed as a K-dimensional random vector drawn from a Dirichlet distribution (the conjugate prior of the categorical distribution), and the parameters will be distributed according to their respective conjugate priors. Mixture models may use any suitable number of arbitrary distributions. Some example distributions are binomial distribution, multinomial distribution, negative binomial distribution, Poisson distribution, exponential distribution, log-normal distribution, multivariate normal distribution, multivariate student's-t distribution, a vector of Bernoulli-distributed values, to name a few.

A "random process model" is a type of mathematical model usually defined as a family of random variables that are indexed by a mathematical set such that each random variable is uniquely associated with an element in the set. The random variables may be associated with or indexed by a set of numbers. These random variables may be viewed at various points in time as they may change over time. Some example random process models may include random walks, martingales, Markov processes, Levy processes, Gaussian processes, random fields, renewal processes, and branching processes.

A "recurrent neural network" is a type of machine-learning algorithm that are modeled loosely after the human brain and which are designed to recognize patterns. Neural networks can classify or cluster new data. They help group unlabeled data according to similarities among the example inputs, and/or they can classify data when a labeled dataset has been used to train the model. Recurrent neural networks is a type of neural network where connections between nodes form a directed graph along a temporal sequence. This allows the recurrent neural network to exhibit temporal dynamic behavior. Recurrent neural networks can use an internal memory to process sequences of inputs, if necessary.

An "application programming interface" (API) may be an interface or communication protocol between a client and a server. In some embodiments, an application programming interface may define formats for specific requests and corresponding responses. An API can take many forms, but can often include specifications for routines, data structures, object classes, variable, or remote calls. An API may be for a web-based system, an operating system, a database system, computer hardware, or a software library, to name a few.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A resource provider may operate a computer to perform operations, which can also be generically referred to as a "resource provider computer".

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "transaction data" including, by way of example only: a service code, a CVV (card verification value), a dCVV (dynamic card verification value), a PAN (primary account number or "account number"), a payment token, a user name, an expiration date, etc. The authorization request message may include additional "transaction data," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a block diagram of an example distributed system 100 in which a monitoring computer 102 (e.g., a computing device of a failure detection system) can be utilized to predict future system failures, according to some embodiments. FIG. 1 shows a transaction processing system, although any suitable system having any suitable number of components may be utilized. The system 100 may include a monitoring computer 102, a user device 106, an access device 108, a resource provider computer 110, a transport computer 112, a processing network computer 114, and an authorizing entity computer 116.

FIG. 1 shows a user 104 that can operate the user device 106 (e.g., a payment card). The user 104 may use the user device 106 to pay for a good or service at a resource provider such as a merchant. The merchant may operate the resource provider computer 110 and/or the access device 108. The resource provider computer 110 may communicate with the authorizing entity computer 116 operated by an issuer, via the transport computer 112 operated by an acquirer and a processing network computer 114 operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow may involve using the user device 106 at the access device 108 can be described as follows. The user device 106 may be a payment card that may be swiped or tapped at the access device 108 to initiate a transaction. The user device 106 and the access device 108 may exchange card data (e.g., provided by the user device 106) and terminal data (e.g., provided by the access device 108). In response to the exchange, a transaction message may be generated by the access device 108 to proceed with a payment. In some embodiments, the transaction message generated by the access device 108 may contain any suitable data such as any suitable transaction data. By way of example, the transaction message may include track 2 data (card data) provided by the user device 106 including payment credentials, merchant data provided by the access device 108, or the like. The transaction message may further indicate an amount associated with the transaction (e.g., a payment price).

The resource provider computer 110 may receive this information from the access device 108 via an external communication interface (e.g., via an application programming interface). The resource provider computer 110 may then generate an authorization request message that includes at least a portion of the information received from the access device 108 and electronically transmits this message to a transport computer 112. The transport computer 112 may then receive, process, and forward the authorization request message to a processing network computer 114 for authorization.

In general, prior to the occurrence of a credit or debit-card transaction, the processing network computer 114 has an established protocol with each issuer on how the issuer's transactions are to be authorized. In some cases, such as when the transaction amount is below a threshold value, the processing network computer 114 may be configured to authorize the transaction based on information that it has about the user's account without generating and transmitting an authorization request message to the authorizing entity computer 116. In other cases, such as when the transaction amount is above a threshold value, the processing network computer 114 may receive the authorization request message, determine the issuer associated with the user device 106, and forward the authorization request message for the transaction to the authorizing entity computer 116 for verification and authorization. Once the transaction is authorized, the authorizing entity computer 116 may generate an authorization response message (that may include an authorization code indicating the transaction is approved or declined) and transmit this electronic message via its external communication interface to processing network computer 114. The processing network computer 114 may then forward the authorization response message to the transport computer 112, which in turn may then transmit the electronic message to comprising the authorization indication to the resource provider computer 110 that may then forward the message to the access device 108.

At the end of the day or at some other suitable time interval, a clearing and settlement process between the resource provider computer 110, the transport computer 112, the processing network computer 114, and/or the authorizing entity computer 116 may be performed on the transaction.

In some embodiments, the monitoring computer 102 (also referred to as a "failure detection platform") may be communicatively connected to any suitable combination of the resource provider computer 110, the transport computer 112, the processing network computer 114, and the authorizing entity computer 116 (collectively referred to as "system components"). Each system component may be configured to transmit an authorization request message not only to the next component in the sequence as described above, but also to the monitoring computer 102. Similarly, each component may transmit a corresponding authorization response message to the next component in the sequence as well as to the monitoring computer 102. Thus, in some embodiments, the monitoring computer 102 may collect network messages (e.g., authorization request messages, authorization response messages, etc.) from any suitable combination of the system components. Each network message may be timestamped (e.g., by the transmitting or by the receiving computer) and may be considered an instance of time series data. Although network messages are utilized in the examples provided herein, it should be appreciated that similar techniques may be utilized to detect future failures utilizing any suitable data, not necessarily network messages specifically.

In some embodiments, the monitoring computer 102 may be configured to train and/or maintain a plurality of models including two or more machine-learning models (e.g., a first model, a second model, etc.) that are configured to predict future system failures based at least in part on network message provided as input.

In some embodiments, the monitoring computer 102 may detect anomalies in historical network messages by providing the historical network messages to a machine-learning model that has been previously trained (e.g., by the monitoring computer 102) to identify anomalies from network messages. In some embodiments, the machine-learning model may be previously trained (e.g., by the monitoring computer 102) utilizing supervised learning techniques and a training data set that includes a plurality of network messages that are labeled as being anomalous or non-anomalous. Subsequent network messages may be provided to the trained model to identify anomalies in those messages. Once identified, particular network message that are deemed anomalous can be labeled (e.g., with a classification label that indicates an anomaly). This labeled data may be utilized by some of the machine-learning algorithms (e.g., supervised machine-learning algorithms) to train one or more additional models (e.g., a second model, any suitable model trained with a supervised machine-learning algorithm, etc.).

Each of the plurality of machine-learning models trained by the monitoring computer 102 may utilize the same or differing machine learning algorithms (e.g., a supervised machine-learning algorithm, a semi-supervised machine-learning algorithm, an unsupervised machine-learning algorithm, etc.). By way of example, a first model of the plurality of models may be trained to identify a first set of anomalies utilizing the time series data and a machine-learning algorithm (e.g., Auto Regressive Integrated Moving Average (ARIMA)). A second model of the plurality of models may be trained to identify a second set of anomalies utilizing time series data, one or more anomalies associated with a classification label (e.g., instances of the time series data that are labeled with a classification label indicative of an anomaly), and a supervised machine-learning algorithm (e.g., a multivariate regression algorithm, random forest, a decision tree, etc.). In some cases, the monitoring computer 102 may utilize the historical network messages to detect one or more anomalies (e.g., an anomaly, a plurality of anomalies) which can then be labeled (e.g., with a classification label indicating the occurrence of an anomaly).

The monitoring computer 102 may train and maintain another machine-learning model (referred to as an "ensemble model" or a "third model") that is trained to predict future system failures based at least in part on the outputs provided by other machine-learning models (e.g., based at least in part on outputs provided by the first model and the second model discussed above, or with outputs provided by any suitable number of models). In some embodiments, the third model may be trained utilizing the outputs of the other machine-learning models and supplemental data (e.g., any suitable data that was not provided by a model such as call center data indicating reasons for customer's calls).

When the ensemble model predicts a system failure, the monitoring computer 102 may be configured to perform one or more remedial actions. By way of example, in response to determining a system failure is to occur within a particular component, the monitoring computer 102 may be configured to perform a remedial action such as notifying (e.g., transmitting a notification such as an email or text message, a push notification, or the like) to the component indicating an action to be taken. For example, the notification may indicate that the component is to switch to a backup server, restart a server, switch to back connections, and the like. In some embodiments, the particular remedial action suggested may depend on the particular type of predicted failure.

Figure 2:
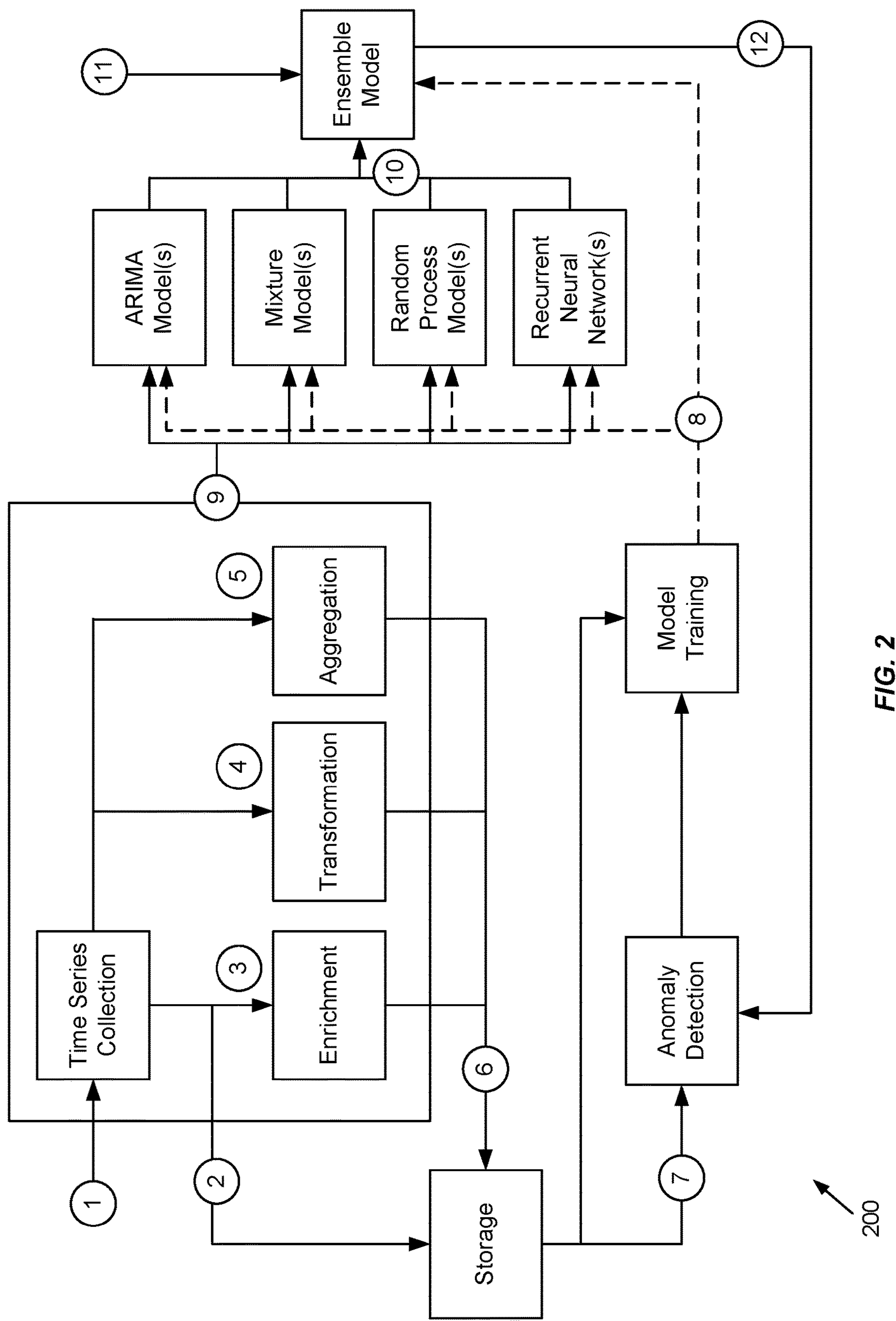
FIG. 2 shows a block diagram illustrating a method for predicting future system failures, according to some embodiments.

FIG. 2 shows a block diagram illustrating a method 200 for predicting future system failures, according to some embodiments. The method 200 may be performed by the monitoring computer 102 of FIG. 1.

The method 200 may begin at step 1, time series data may be collected from components of a distributed system (e.g., any suitable component of the distributed system 100 of FIG. 1). "Time series data" may refer to a series of data points (e.g., messages) that are indexed by time. Each data point (message) may include any suitable number of data attributes (e.g., data fields). Each data point can be associated with a timestamp or other suitable indicator of time (or order with respect to other data points a series). In some embodiments, the time series data may be collected all at one and/or periodically, at regular intervals, and/or over some period of time. As a non-limiting example, each data point may be a network packet (e.g., a message such as an authorization request message and/or a corresponding authorization response message), an error detected by the system component, a latency between related messages, a time since a previous action, or any suitable data related to a transaction as described above in connection with FIG. 1.

At step 2, the monitoring computer 102 may store the received time series data in a data store for subsequent use. In some embodiments, the monitoring computer 102 may store related data points in a common storage container. For example, messages transmitted and/or received by a particular system component may be stored in one storage container while the messages transmitted and/or received by another system component may be stored in a different storage container. In some embodiments, the monitoring computer 102 may receive multiple types of data from a system component and may combine the multiple types of data in a storage container associated with the system component.

At step 3, the monitoring computer 102 may perform one or more processes for enriching the time series collection data. By way of example, the monitoring computer 102 may calculate an elapsed time between related messages (e.g., a time that elapsed between transmission of an authorization request message and receipt of a corresponding authorization response message).

At step 4, the monitoring computer 102 may perform one or more processes for transforming the time series data as originally received into one or more different formats. In some embodiments, one or more data transforms may be applied to the time series data. A data transform may be used to remove noise and/or to improve the signals provided in the time series data. In some embodiments, the monitoring computer 102 may utilize a predefine list of transforms that correspond to reformatting and/or transforming the time series data to suit a number of predetermined machine-learning algorithms.

As an example, a time series data set that has a quadratic growth trend can be made linear by taking the square root (e.g., applying a square root transform) of the data points. In some embodiments, an exponential time series distribution can be made linear by taking the logarithm of the values of the data points (e.g., applying a log transform). In some embodiments, the monitoring computer 102 may utilize a box-cox transform (e.g., a configurable data transform method that supports square root, log, and other related transforms) to transform the time series data. A power transform can be utilized by the monitoring computer 102 to remove a shift from a data distribution to make the distribution more normal (Gaussian). On a time series dataset, this can have the effect of removing a change in variance over time. Yet another example transform can include a different transform which can be used to remove a systematic structure from time series data. For example, a trend can be removed by subtracting the previous value from each value in the time series. The monitoring computer 102 can normalize the data by rescaling the time series data from an original range to a new range (e.g., from a range of 1-100 to a range of 0-1). A standardization transform may be utilized to transform time series data with a Gaussian distribution. In some embodiments, this transform can have the effect of transforming the time series data to have a mean of zero, or centered, with a standard deviation of 1. The transforms discussed herein are merely illustrative examples, any suitable transform may be utilized by the monitoring computer 102 according to any suitable predefined rules in order to transform the time series data to be in a format that is suitable/optimal for a specific set of model types that are to be trained and maintained by the monitoring computer 102.

At step 5, the monitoring computer 102 may perform any suitable number of processes for performing time series data aggregation. "Time series data aggregation" may refer to the aggregation of time series data points (e.g., for a system component) over a specified time period (referred to as the "granularity"). As a non-limiting example, the granularity for an aggregation of time series data may be 30 minutes. Thus, in this example, the monitoring computer 102 may perform operations to aggregate all data points (e.g., from a particular system component, from all system components, etc.) within each 30 minute time period of the time series data set. The monitoring computer 102 may aggregate the whole time series into any suitable number of corresponding 30 minutes time periods. In some embodiments, the monitoring computer 102 may be configured to combine values of the time series data in a given time period. For example, an average of the time series data points may be computed and associated with the particular time period. By aggregating the time series data, the monitoring computer 102 can significantly reduce the computational requirements needed to later train a model.

At step 6, any resultant data such as additional data fields, transformed data sets, and/or aggregated data may be stored in a data store. In some embodiments, this data may be stored with or correlated with the time series data original received. By way of example, the time series data, the enriched time series data, the transformed time series data, and the aggregated time series data, may be stored together as a tuple or in any suitable data container.

At step 7, the monitoring computer 102 may be configured to perform any suitable process for detecting anomalies in the stored data. An "anomaly" refers to an outlier data point that is an outlier based at least in part on some standard or usual signal of the data set. For example, an unexpected spike or drop in messages may indicate an anomaly.

In some embodiments, one or more anomaly detection algorithms may be utilized to detect anomalies in the time series data. By way of example, a supervised machine-learning algorithm may be utilized to detect anomalies in a data set. A supervised machine-learning algorithm may utilize a training data set that includes normal samples and samples that illustrate an anomaly. Each sample can be labeled as an anomaly or as a non-anomaly. Some example supervised algorithms may include supervised neural networks, parameterization of a training model, support vector machine learning, Bayesian networks, decision trees, k-nearest neighbors, and the like. As a non-limiting example, a k-nearest neighbor algorithm may be utilized to calculate the approximate distances between different points (e.g., different data points, input vectors, etc.) and then assigns an unlabeled point to the class of its k-nearest neighbors. If its neighbors are anomalies, then the data point may also be labeled/classified as an anomaly. Otherwise, the data point may be labeled as a non-anomaly.

In some embodiments, anomaly detection can occur using an unsupervised machine-learning algorithm. An unsupervised machine-learning algorithm does not require training data. Unsupervised machine-learning algorithms presume two things: 1) only a small percentage of data is anomalous and 2) any anomaly is statistically different from the normal samples. Based on these presumptions, data samples that similar and occur frequently may be grouped (e.g., clustered) and assumed to be normal, while other data samples that occur infrequently (e.g., the data point is not near the cluster) may be considered an anomaly. Some example unsupervised machine-learning algorithms include k-means, c-means, self-organizing maps, one-class support vector machines, expectation-maximization meta-algorithm, and adaptive resonance theory.

In some embodiments, a seasonal-trend decomposition procedure may be utilized to split the time series data signal into three parts: seasonal, trend, and residue. If the deviation of residue is monitored and a threshold is applied, then any data point that breaches that threshold may be considered an anomaly. Each data sample of the previously stored training data may be labeled as being an anomaly and/or as being a non-anomaly. In some embodiments, these labeled may also be stored.

At step 8, a number of additional machine-learning models and/or statistical models (referred collectively as "models") may be trained and/or fit using the time series data and/or the time series data as enriched, transformed, and/or aggregated at steps 3-5, respectively. Any suitable number of models may be trained/fit. However, in some embodiments, the models may include an ARIMA model, a mixture model, a random process model, a recurrent neural network, or any suitable combination of two or more of the models listed above. Each of these models may be an example of a “first model” and/or a “second model.”

In some embodiments, the time series data (as enriched, transformed, and/or aggregated) may be utilized with one or more autoregressive algorithms (e.g., an ARIMA algorithm, an ARMA algorithm, etc.) to fit one or more models to the time series data. One or more models may be fit to the time series data either to better understand the data and/or to predict future points in the series (referred to as “forecasting”). A model that is fit to time series data may be referred to as a “statistical model.” Any suitable number and type of statistical models may be fit to the time series data in order to forecast (predict) subsequent data points (e.g., anomalies indicating a system failure).

In some embodiments, past time points of time series data can impact current and future time points. ARIMA is one of those models. ARIMA can use a number of lagged observations of times series to forecast (predict) observations. A weight can be applied to each of the past observations and the weights can vary based on how recent they are. This can be referred to as auto-regression, which is the process of regressing a variable on past values of itself. In an ARIMA model, an integrated property can be utilized to reduce the seasonality of the time series data. For example, an ARIMA model may utilize a degree of differencing which can remove seasonality. An ARIMA model may also utilize a moving average to remove non-determinism or random movements from the time series. Coefficients of the ARIMA model may be calculated recursively and a model may be chosen based on the estimated results calculated from that model being closer to the actual observed values.

In some embodiments, one or more mixture models may be fit to the time series data (e.g., as received, as enriched, as transformed, and/or as aggregated). statistical model that utilizes a number of mixture components. A typical finite-dimensional mixture model is a hierarchical model consisting of the following components: 1) N random variables that are observed, each distributed according to a mixture of K components, with the components belonging to the same parametric family of distributions (e.g., all normal, all Zipfian, etc.) but with different parameters, 2) N random latent variables specifying the identity of the mixture component of each observation, each distributed according to a K-dimensional categorical distribution, 3) a set of K mixture weights, which are probabilities that sum to 1, and 4) a set of K parameters, each specifying the parameter of the corresponding mixture component. In some embodiments, the mixture model(s) may utilize any suitable number of arbitrary distributions. Some example distributions are binomial distribution, multinomial distribution, negative binomial distribution, Poisson distribution, exponential distribution, log-normal distribution, multivariate normal distribution, multivariate student's-t distribution, and a vector of Bernoulli-distributed values, to name a few.

As a non-limiting example, a Gaussian mixture model (GMM) (e.g., a probabilistic model) may be fit to the time series data (as received, enriched, transformed, or aggregated). A GMM may assume that the observed data is made up of a mixture of several Gaussian distributions which may also be given different mixture weights. The final distribution for the time series data can be obtained by multiplying each mixture component by its associated mixture weight before adding them together. A GMM may be a form of unsupervised learning. Although a supervised learning GMM may additionally or alternatively be used. Any suitable number of mixture models each utilizing any suitable number of distributions may be utilized to model the data.

In some embodiments, a random process model may be fit to the time series data. A random process model may be a type of mathematical model usually defined as a family of random variables that are indexed by a mathematical set such that each random variable is uniquely associated with an element in the set. The random variables may be associated with or indexed by a set of numbers. These random variables may be viewed at various points in time as they may change over time. Some example random process models may include random walks, martingales, Markov processes, Levy processes, Gaussian processes, random fields, renewal processes, and branching processes.

By way of example, a Markov process may be fit to the time series data (e.g., as received, enriched, transformed, or aggregated). A Markov Chain, for example, is a mathematical system defined as a collection of random variables, that transition from one state to another according to certain probabilistic rules. The transitions may satisfy the Markov property which states that the probability of transitioning to any particular state is dependent solely on the current state and time elapsed, and not on the sequence of states that preceded it. The a Markov Chain is memoryless. A transition matrix can be generated for the Markov Chain that quantifies the probability from transitioning from one state to another. This transition matrix can be generated based at least in part on the time series data and the labels. One or more states of the Markov Chain can represent a failure state (e.g., an anomaly). By utilizing the transition matrix, a probability that a transition to a failure state (an anomaly) is to occur can be computed. If that probability exceeds a threshold value, then the Markov Chain can be said to predict a failure. Markov Chains can be utilized in a manner akin to supervised or unsupervised learning.

In some embodiments, a recurrent neural network (RNN) may be generated to model the time series data (e.g., as received, enriched, transformed, or aggregated). A RNN is a type of machine-learning algorithm that can classify or cluster new data. An RNN can group unlabeled data (e.g., new time series data) according to similarities among the example inputs, and/or they can classify data when a labeled dataset has been used to train the model. In some embodiments, the labeled time series data (e.g., with examples labeled “anomaly” or “non-anomaly” may be used to train the RNN to identify, based on time series data, whether an anomaly is likely to occur in the future.

In some embodiments, each of the models generated (e.g., an ARIMA model, a mixture model, a random process model, an RNN, or any suitable combination of two or more of the above) may be utilized to provide corresponding outputs indicating a likelihood that an anomaly is to occur (e.g., within a particular future time period such as the next 5 minutes). A training data set including outputs of each of the models may be utilized to train an ensemble model. An “ensemble model” refers to a machine-learning model that takes as input at least two outputs provided by any suitable combination of corresponding machine-learning models and/or statistical models. In some embodiments, the outputs of the models and the labeled time series data may be combined to form the training data set for the ensemble model. The ensemble model may utilize any suitable supervised machine-learning algorithm to train the model to classify whether future data indicates the occurrence and/or likelihood of a failure. In some embodiments, the output of the ensemble model may be a value that indicates the likelihood of the failure. If the output breaches a predefined threshold, then the input data can be identified as being indicative of a system failure. In some embodiments, the training data set may include supplemental data such as a number of calls from a call center (e.g., an IT help call center) or the like that can be used as another signal for determining whether an error has occurred. In some embodiments, the ensemble model may be trained to classify and/or cluster the training data set examples. Thus, the output of the ensemble model may indicate not only a likelihood that a failure is to occur, but also a type of failure predicted.

At step 9, once the various models have been trained, new time series data may be collected (e.g., from the components of FIG. 1). In some embodiments, similar operations may be performed to enrich, transform, and/or aggregate the new time series data as described at steps 3-5 above. The new time series data (as received, enriched, transformed, and aggregated) can be provided as input to the models (excluding the ensemble model) to generate output from each of those models.

At step 10, the outputs of the models may be combined with the new time series data.

At step 11, in some embodiments, supplemental data (e.g., a number of IT support calls) can be received. The new time series data (including the outputs of the other models) and, in some cases the supplemental data, may be provided to the ensemble model as input. If the output indicates a likelihood (over a predefined threshold) that a failure (of a particular failure type) is to occur (e.g., for a particular component within a particular time period such as the next ten minutes), a notification may be sent to the entity associated with the component corresponding to the failure that is likely to occur. In some embodiments, a predefined mapping may be utilized to look up a particular action to be taken. In some embodiments, the mapping may identify a particular action to be taken (e.g., restart a particular server, switch to backup servers, switch to backup connections, etc.) based at least in part on the particular type of failure predicted. The notification can be in any suitable format (e.g., an email message, a text message, a push notification, etc.).

At step 12, the new time series data may be labeled as an "anomaly" or a non-anomaly based at least in part on the output of the ensemble (e.g., "anomaly" if the threshold is breached, "non-anomaly" if the threshold is not breached). The labeled instance of time series data may be added to the training data set and may be utilized later to incrementally update, retrain, and/or refit the models.

Figure 3:
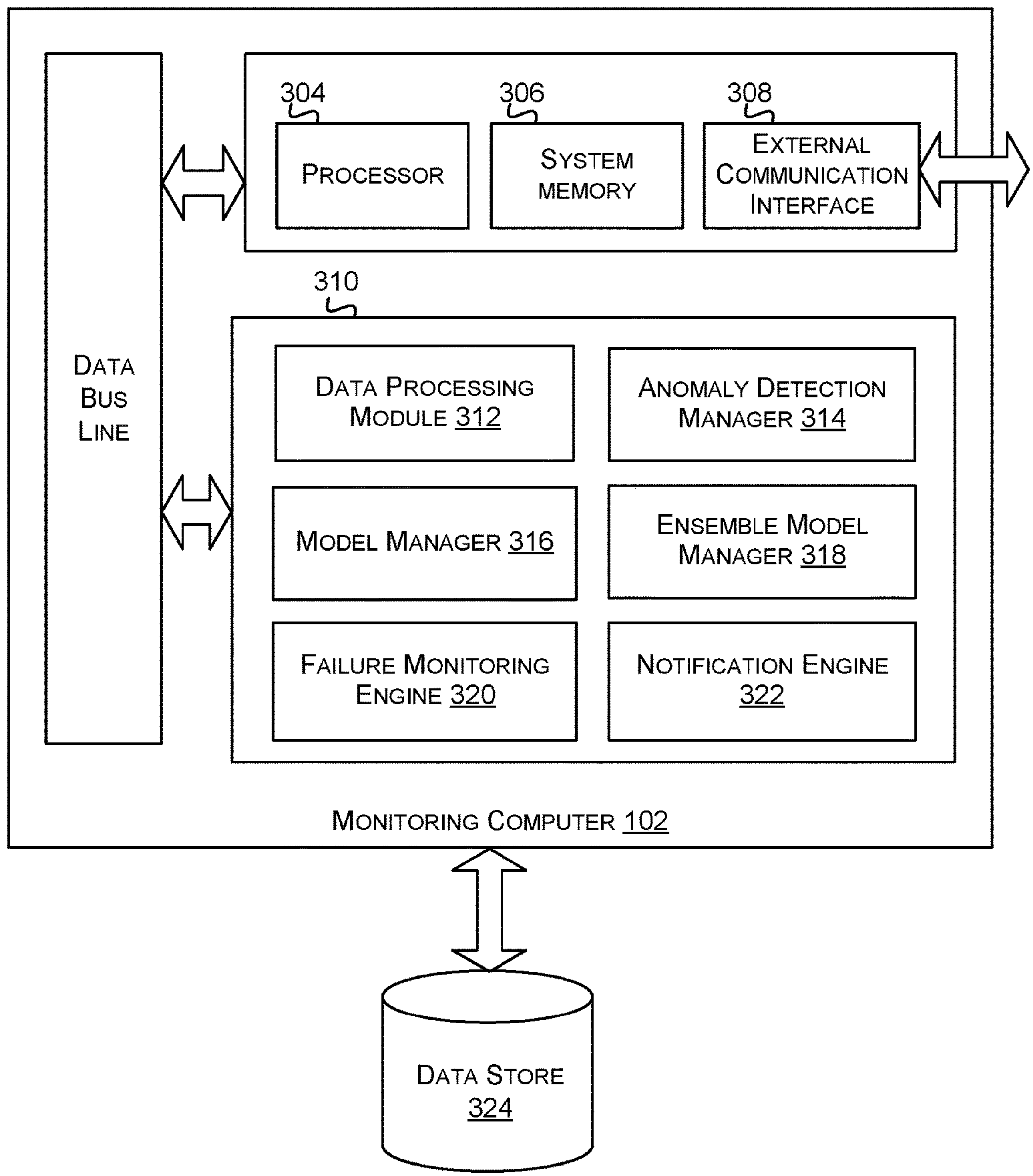
FIG. 3 shows a block diagram of an example monitoring computer, according to some embodiments.

FIG. 3 shows a block diagram of an example monitoring computer 102, according to some embodiments. The monitoring computer 102 may include a processor 304. The processor 304 may be coupled to a system memory 306 and an external communication interface 308.

A computer readable medium 310 may also be operatively coupled to the processor 304. The computer readable medium 310 may comprise software that is executable by the processor 304. For example, the computer readable medium 310 may include a number of software modules executable by the processor 304 such as a data processing module 312, an anomaly detection manager 314, a model manager 316, an ensemble model manager 318, a failure monitoring engine 320, and a notification engine 322. In some embodiments, each, or some subset of the modules of FIG. 6 may be communicatively connected to the data store 624.

The data store 324 may be implemented using various data structures, such as an array, hash map, (linked) list, structured text file (e.g., XML), table, and/or the like. Such data structures may be stored in memory and/or in structured files. The data store 324 may be configured to store any suitable data associated with providing the functionality of the monitoring computer 102 as discussed above. By way of example, the data store 324 may store any suitable number of machine-learning models, training data sets, one or more ensemble models, historical system data (e.g., historical network messages), and the like.

The data processing module 312 may be configured to cause the processor 304 to receive any suitable data from any suitable source. By way of example, the data processing module 312 may be configured to receive any suitable number of training data sets. In some embodiments, a training data set may include any suitable number of historical network messages (e.g., authorization request messages, authorization response messages, etc.) between components of a distributed system. In some embodiments, the training data sets may include time series data. These historical network messages may be any suitable message that is exchanged between such components. In some embodiments, the historical network messages may be time-stamped or otherwise indexed/ordered by time. In some examples, each network message may be associated with a response time indicating an amount of time that elapsed before a response was received for the message. In some embodiments, the data processing module 312 may combine multiple related messages and/or supplement a message with supplemental data. By way of example, the data processing module 312 may receive an authorization request message and subsequently a corresponding authorization response message. In some embodiments, the data processing module 312 may store data of the authorizing request message with the data received in the authorization response message. If a time period that elapsed between transmission (by a system component) of the authorization request message and reception (by the system component) of the authorization response message is unknown, the data processing module 312 may calculate this time period and associated this time period with the authorization request message and/or the authorization response message. In some embodiments, the data processing module 312 may be configured to cause the processor 304 to perform any suitable operation discussed above in connection with steps 1-5 of FIG. 2. In some embodiments, the data processing module 312 may store the historical network messages (e.g., also referred to as time series data) in a suitable data store such as data store 324.

In some embodiments, the anomaly detection manager 314 may be configured to cause the processor 304 to detect anomalies in the stored data (e.g., the time series data retrieved from data store 324). An "anomaly" refers to an outlier data point that is an outlier based at least in part on some standard or usual signal of the data set. The anomaly detection manager 314 can be configured to cause the processor 304 to execute one or more anomaly detection algorithms to detect anomalies in the time series data. By way of example, the anomaly detection manager 314 may obtain, train, and/or maintain a machine-learning model that may be utilized to detect anomalies in new time series data input. The machine-learning model may be trained utilizing the training data stored in data store 324. In some embodiments, examples in the training data can be previously labeled as being indicative of an anomaly or not and a supervised machine-learning algorithm may utilized to train the model. Some example supervised algorithms may include supervised neural networks, parameterization of a training model, support vector machine learning, Bayesian networks, decision trees, k-nearest neighbors, and the like. In some embodiments, a k-nearest neighbor algorithm may be utilized to calculate the approximate distances between different points (e.g., different data points, input vectors, etc.) and then assigns an unlabeled example to the class of its k-nearest neighbors. If its neighbors are anomalies, then that example may also be labeled/classified as an anomaly. Otherwise, the data point may be labeled as a non-anomaly. In some embodiments, the anomaly detection manager 314 can use an unsupervised machine-learning algorithm such as k-means, c-means, self-organizing maps, one-class support vector machines, expectation-maximization meta-algorithm, or adaptive resonance theory to classify/cluster the data in order to identify and label the example as being indicative of an anomaly or not. In either case, the anomaly detection manager 314 can store the now labeled data in the data store 324.

In some embodiments, the model manager 316 may be configured to cause the processor 304 to train any suitable machine-learning model discussed above in connection with FIG. 2. Additionally, or alternatively, the model manager 316 may be configured to cause the processor 304 to fit a statistical model to the labeled time series data (as received, enriched, transformed, and aggregated). By way of example, the model manager 316 may generate an ARIMA model, a mixture model, a random process model, and a recurrent neural network as discussed above in connection with FIG. 2. Each may model the labeled time series data and each model may provide an output indicating a likelihood that a time series data example indicates a future failure is to occur (e.g., within some period of time such as the next five minutes). The model manager 316 may be configured to provide each labeled instance of time series data to the various models to generate corresponding model outputs. The model manager 316 may store these model outputs as part of the labeled time series data stored in data store 324. Each of the models may be stored in the data store 324 for subsequent use.

In some embodiments, the ensemble model manager 318 may be configured to cause the processor 304 to generate, train, and maintain an ensemble model. The ensemble model may be trained utilizing any suitable supervised machine-learning algorithm and the time series data as labeled and supplemented with the various model outputs (referred to as a "resultant data set"). In some embodiments, the ensemble model manager 318 may enrich the resultant data set with any suitable supplemental data such as a number of calls, emails, text, complaints, and the like received within a period of time (with respect to the timestamp associated with a given time series data example). The ensemble model manager 318 may utilize the resultant data set (and in some cases the supplemental data) as training data to train the ensemble model (using a supervised machine-learning algorithm) to predict a future system failure. The ensemble model may be stored in the data store 324 for subsequent use.

In some embodiments, the failure monitoring engine 320 may be configured to cause the processor 304 to receive new input data (e.g., new time series data from the data processing module 312). The new input data already be enriched, transformed, and/or aggregated by the data processing module 312. The failure monitoring engine 320 may provide the new input data to each of the models trained by model manager 316 to produce a number of outputs. The failure monitoring engine 320 may combine the outputs with the new input data and provide the combination to the ensemble model trained by the ensemble model manager 318. In some embodiments, the failure monitoring engine 320 may additionally retrieve a value corresponding to a number of emails, text, calls, or the like received in a period of time (e.g., the last 30 minutes) from any suitable source. If retrieved, the value may also be provided to the ensemble model as input. The output of the ensemble model may be provided to the notification engine 322. In some embodiments, the failure monitoring engine 320 may label the new input data as being anomalous or non-anomalous and may store the labeled input data as a new instance of training data within the data store 324. Thus, the training data set of data store 324 can grow and each of the models and/or the ensemble model may be updated and/or retrained over time to produce more accurate outputs.

In some embodiments, the notification engine 322 may be configured to cause the processor 304 to provide one or more notifications to one or more system components in response to receiving an indication (e.g., from the failure monitoring engine 320) that a failure has been predicted and/or detected (e.g., the ensemble model has outputted a value that indicates anomalous behavior). A notification may include any suitable electronic communication. By way of example, a notification can be provided via email, text message, push notification, pop up window, or any suitable interface hosted by the notification engine 322. In some embodiments, the notification may include a remedial action. The notification engine 322 may access a predefined list of remedial actions stored in the data store 324. Each remedial action may be associated with a failure type and/or a system component. The notification engine 322 may utilized the predicted/detected failure type and the particular system component to which the failure relates to determine an associated remedial action. The notification engine 322 may provide an indication that the remedial action should be performed to the affected system component (or an agent of the system component). In some embodiments, remedial actions can include, but are not limited to, restarting a server, switching to a backup server, switching to a backup communications channel, performing a virus scan, calling a technician, powering down a computing device, and/or the like.

TECHNICAL ADVANTAGES

Embodiments of the invention have a number of advantages. For example, utilizing the techniques discussed above, a failure can be detected from any suitable component of a distributed system by utilizing the response times between network messages as an indicator of failure. Additionally, by utilizing a combination of various statistical and machine-learning models, predictions of future failures can be made more accurate as a combination of differing predictive techniques may be employed. Each of these models updated and/or retrained over time making the ensemble model discussed herein even more accurate over time. By utilizing these various models as input for an ensemble model, the system is more likely to detect future failures than conventional systems that utilize only statistical or machine-learning models.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:

obtaining, by a failure detection platform, time series data corresponding to historical network messages;

identifying, by the failure detection platform, a plurality of anomalies in the time series data;

associating, by the failure detection platform, one or more anomalies of the plurality of anomalies with a classification label indicative of a network failure;

training, by the failure detection platform, a first model of a plurality of models utilizing the time series data;

training, by the failure detection platform, a second model of the plurality of models utilizing the time series data, the one or more anomalies associated with the classification label, and a supervised machine-learning algorithm;

training, by the failure detection platform, a third model based at least in part on outputs of the plurality of models;

predicting, by the failure detection platform, a future network failure utilizing the third model; and performing, by the failure detection platform, one or more remedial actions in response to predicting the future network failure.

2. The method of claim 1, wherein the historical network messages of the time series data correspond to a distributed system comprising a plurality of computing devices.

3. The method of claim 1, wherein the time series data comprises response times corresponding to the historical network messages.

4. The method of claim 1, wherein the historical network messages of the time series data comprise authorization request messages and corresponding authorization response messages.

5. The method of claim 1, wherein identifying an anomaly of the plurality of anomalies comprises determining that a threshold period of time elapsed between an authorization request message during which a corresponding authorization response message was not received.

6. The method of claim 1, further comprising transforming the time series data prior to training the first model.

7. The method of claim 1, wherein at least one of the first model or the second model is a recurrent neural network.

8. The method of claim 1, wherein the first model is an auto-regression integrated moving average (ARIMA) model that is fit to the time series data.

9. The method of claim 1, wherein the first model is trained utilizing a stochastic process with a Markov property.

10. The method of claim 1, wherein identifying the plurality of anomalies utilizes an unsupervised learning technique with the time series data.

11. A computing device of a failure detection platform, the computing device comprising:

a processor; and a memory comprising a computer readable storage medium that stores computer-executable instructions that, when executed by the processor, cause the computing device to perform operations comprising:

obtaining time series data corresponding to historical network messages of a distributed network;

identifying a plurality of anomalies in the time series data;

associating one or more anomalies of the plurality of anomalies with a classification label indicative of a network failure;

training a first model of a plurality of models utilizing the time series data;

training a second model of the plurality of models utilizing the time series data, the one or more anomalies associated with the classification label, and a supervised machine-learning algorithm;

training a third model based at least in part on outputs of the plurality of models;

predicting a future system failure utilizing the third model; and performing one or more remedial actions in response to predicting the future system failure.

12. The computing device of claim 11, wherein the plurality of models comprise a first set of models trained utilizing at least one time series forecasting method, a second set of models trained utilizing at least one random distribution of the time series data, a third set of models trained utilizing at least one Markov process, and a fourth set of models comprising one or more recurrent neural networks.

13. The computing device of claim 11, wherein executing the computer-executable instructions further causes the computing device to perform additional operations comprising transforming the time series data to a stationary data set, wherein transforming the time series data utilizes a differencing method.

14. The computing device of claim 11, wherein the historical network messages of the time series data comprise a plurality of authorization request messages.

15. The computing device of claim 11, wherein the time series data comprises a first value indicating first time at which an authorization request message was sent from a first computing component to a second computing component and a second value, the second value indicating a second time at which an authorization response message corresponding to the authorization request message was received or that the authorization response message corresponding to the authorization request message was not received.

16. The computing device of claim 11, wherein at least one output of the plurality of models comprises a probability value indicating that input data provided to the third model signals a failure of at least one computing component of the distributed network.

17. The computing device of claim 11, wherein at least one output of the plurality of models comprises an additional classification label.

18. The computing device of claim 11, wherein the one or more remedial actions comprises transmitting a notification to at least one computing component of the distributed network, the notification comprising information indicating a failure of the at least one computing component.

19. The computing device of claim 11, wherein the one or more remedial actions comprises requesting that at least one computing component of the distributed network perform a system reset.

20. The computing device of claim 11, wherein executing the computer-executable instructions further causes the computing device to perform additional operations comprising converting the times series data utilizing a window function aggregation.

* * * * *